H. M. CONE
May 27, 1930. THERMOSTATIC CONTROL OF A VENT IN A CHAMBER Re. 17,676
Original Filed April 19, 1926 2 Sheets-Sheet 1
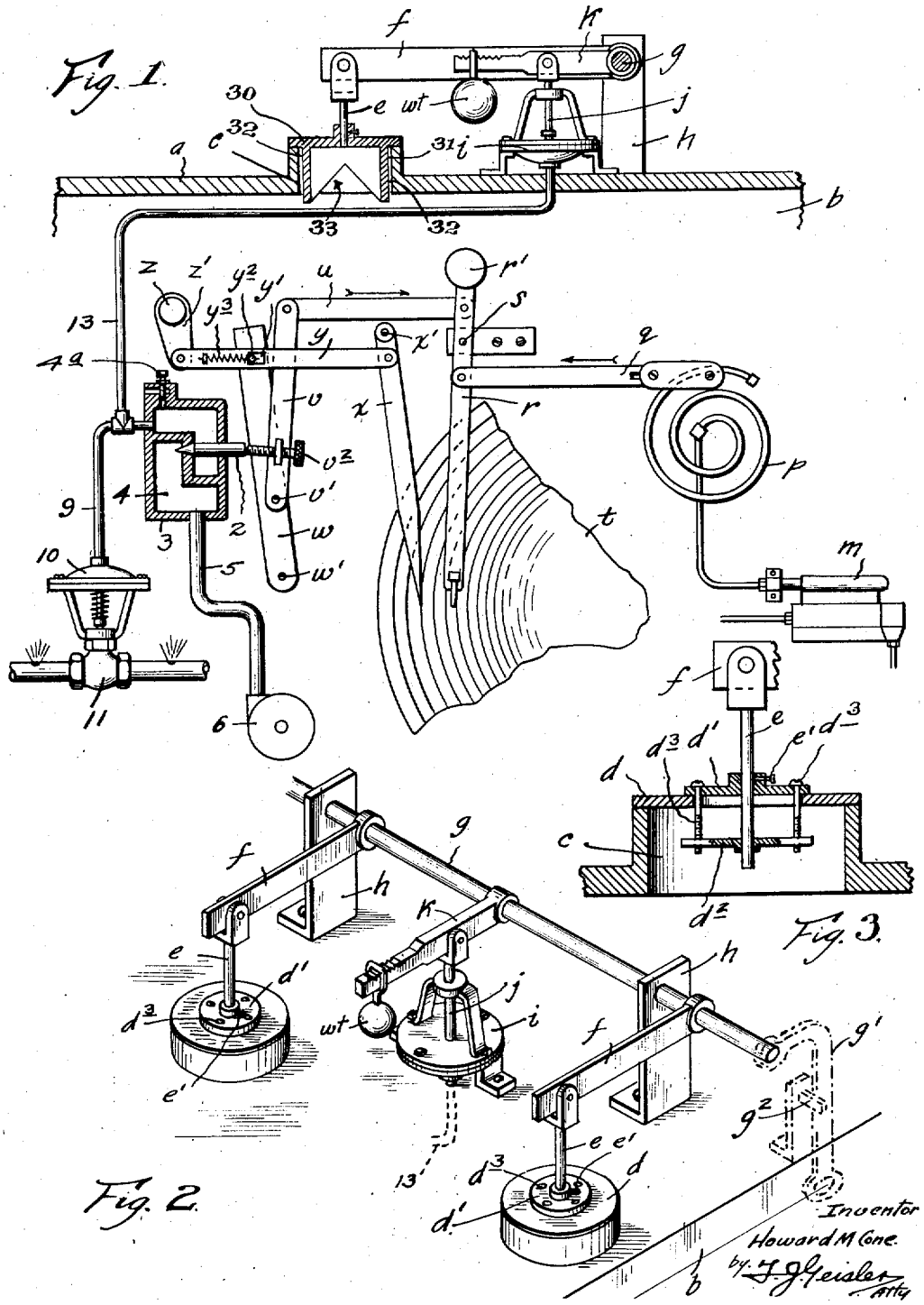

May 27, 1930. H. M. CONE Re. 17,676

THERMOSTATIC CONTROL OF A VENT IN A CHAMBER

Original Filed April 19, 1926 2 Sheets-Sheet 2

Inventor:
Howard M. Cone
by T. J. Geisler
Attorney

Reissued May 27, 1930

Re. 17,676

UNITED STATES PATENT OFFICE

HOWARD M. CONE, OF LONGVIEW, WASHINGTON, ASSIGNOR OF ONE-HALF TO THE LONG-BELL LUMBER COMPANY, OF KANSAS CITY, MISSOURI, A CORPORATION OF MISSOURI

THERMOSTATIC CONTROL OF A VENT IN A CHAMBER

Original No. 1,705,176, dated March 12, 1929, Serial No. 103,048, filed April 19, 1926. Application for reissue filed March 22, 1930. Serial No. 438,847.

My invention relates particularly to the control of the relative humidity in lumber dry kilns by thermostatically operated means, although the same may be profitably employed for other uses. I will confine the description of my invention, however, to its use in a lumber kiln in this connection.

It is convenient to quote the following from Bulletin 5A (October, 1925, edition) entitled "Tycos Instruments for Lumber Dry Kilns" published by the Taylor Instrument Companies, of Rochester, New York.

"It is well known that two of the most important factors in lumber drying are temperature and humidity. One of the advantages of kiln drying is, that it is possible to maintain proper drying conditions independent of weather conditions, thereby controlling the drying process and the final moisture content. * * *"

"Even the most inefficiently operated kiln is capable of evaporating moisture from wood. The real problem, however, is to remove the moisture in the shortest time possible, without impairing the quality of the stock being dried, and with the minimum of steam consumption and kiln supervision. * * *"

"The amount of moisture in the air affects the rate at which the moisture is evaporated from the surface of the stock, and the extent to which the wood will dry. If the air is very dry (humidity too low) excessive evaporation causes the fibres to become stiff and dry, resulting in extreme case hardening. This condition causes unequal stresses in the boards, which if allowed to continue, results in familiar defects, such as checking, warping and in loss of time and expensive kiln operations. * * *"

To maintain proper drying conditions, by hand adjustment of spray and heat line valves is practically impossible. Therefore, automatic devices for controlling the spray and heat line valves were heretofore provided as described in said bulletin.

But the mere automatic control of the spray and heat lines is not sufficient. The dead steam and air which collects under the roof of the dry kiln and does not circulate causes inequalities in the temperatures in the kiln. Not only this, the latent heat given off by the condensation of the moisture in the lumber, after the spray line is turned off, tends to cause sudden rises in the temperature, and thus a sudden fall in relative humidity will result. A sudden increase in heat and corresponding fall in humidity will dry the lumber too quickly; and the last mentioned conditions cannot be anticipated nor prevent except by the opening of the covers of the vents in the roof of the kiln to permit the escape of the dead steam and heat.

At the present time the covers of the vents in the roof of the kiln are manually operated by an attendant who may, or may not always, be on duty. In any event no matter how careful he is, he has no accurate means of knowing exactly how much, when or how long to open or keep open these covers.

But "regardless of the operator's experience, and the skill which he may acquire, it is not within human ability instantly to change the position of the roof covers, so that the proper temperature and humidity will always be maintained. The change in temperature and humidity has occurred before the eye can detect it, or the hand prevent it."

The object of my invention is to provide an efficient automatic control for the roof vents in dry kilns; thus to relieve the operator of the constant necessity of constant watching and assuring that the roof vents will be controlled so as to cooperate with the heating coils and the spray line to assure just the right predetermined temperature and humidity.

I attain my object by providing automatic thermostatic controlled means for opening and closing the spring line valve and the roof vents in time with each other. This control, is effected through the medium of a wet bulb or dry bulb similar to the operation of said "Tycos" device, and located at any convenient point within the kiln, and by providing means for imposing a variable interval of time between the operations of the spray line valve and roof vent control, in that way assuring an accurate cooperation of all the means provided for placing the air within the kiln in the desired state as to temperature and humidity, with regard to a run of a particular kind of lumber.

The automatic operation of the means for controlling the roof vents may be accomplished through the medium of pressure operating devices, or through the medium of electro-magnetically operated devices, which in turn are automatically controlled by the thermostatic conditions within the kiln. Both of these means are illustrated in the accompanying drawings, and hereinafter fully described.

In the accompanying drawings, Fig. 1 shows a section of the roof of a kiln provided with a vent and means for controlling the outlet from the kiln through said vent, and illustrated diagrammatically one combination of devices by which the vent controlling means are thermostatically operated in order to attain the above mentioned objects and results. The devices here shown for operating the vent controlling means are actuated by fluid pressure, and the thermostatic element provided for operating the vent controlling means consists of devices at present employed for controlling the temperature and humidity of a kiln chamber.

Fig. 2 shows a fragmentary perspective view of a section of the roof of a kiln provided with a number of vents, and the means for operating all these vents as a unit.

Fig. 3 illustrates different means, than that shown in Figs. 1 and 4 for controlling the vent; the cover shown in Fig. 3 being adapted to provide, on being lifted, at first only a small opening for the vent, and then a larger opening with the further lifting of the cover.

Upon the roof *a* of the kiln *b* are mounted, in alinement a number of spaced vents *c* controlled by dampers or covers *d*. These covers hang from rods *e* pivotally supported from the ends of arms *f*, rigidly secured to a rock-shaft *g*. This shaft is suitably journaled in bearings *h* mounted to the roof *a*.

Prior to my invention the rock-shaft was rotated manually by means of an arm $g'$ set at any desired position by a rack $g^2$, as illustrated by Fig. 2, thereby opening the vents to any desired degree.

Referring first to Fig. 1: The roof *a* of the dry kiln has a vent *c* controlled by a cover *d*. The pressure actuated device raises the diaphragm lever *k* to which the stem of the pressure actuated device is suitably fastened. The lever *k* is fixed to rock-shaft, *g*, which is journaled on the roof of the kiln in bearings *h* as mentioned, and actuates the cover lever *f* from which is suspended the cover *d*.

Figure 4:
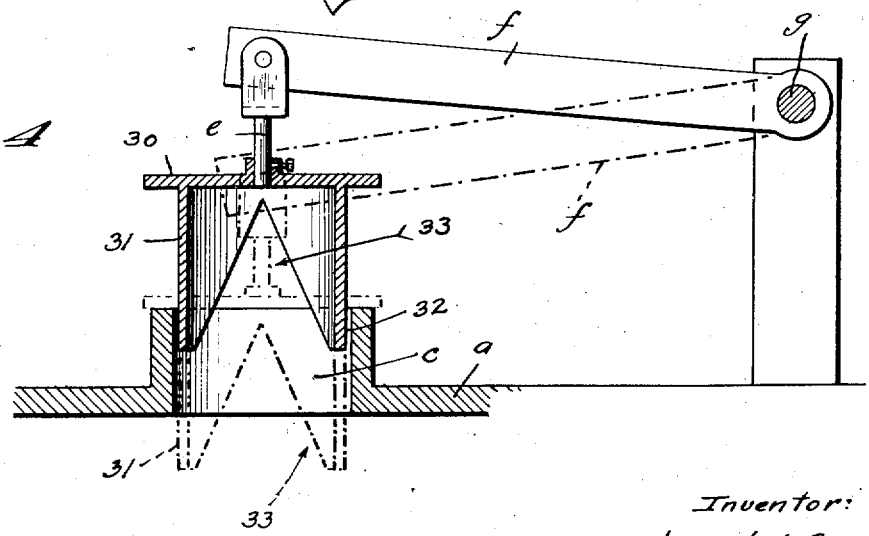
Fig. 4 shows an enlarged view of the vent and cover thereof shown in Fig. 1 in order to illustrate more clearly the arrangement of the cover by which it is adjustable for varying the control of the vent outlet.

The cover as shown in Figs. 1 and 4 comprises a cover 30 rigidly suspended from the stem *e*, which sets tightly over the vent *c*. A sleeve 31 is formed on the underside of the cover 30 which fits loosely in the vent *c* providing a space 32 between the sleeve 31 and the side of the vent *c* to provide an opening on the cover, which is only slightly lifted. This sleeve 31 is provided with a number of triangular notches 33, so that as the cover is lifted the opening will gradually increase until the vent is opened to its fullest extent.

The arm *k* is weighted by a movable weight *wt*, thereby forcing the pressure actuated device to operate against said weight, and in that way providing means for regulating the amount of pressure required to lift the cover off the vent for more or less opening the latter.

It is assumed that the kiln is provided with a thermostatic control of the "Tycos" type, the actuating element, thus the wet-bulb for example, being located at any convenient point in the kiln chamber.

The Tycos device, as well known, comprises a Bourdon type of helical spring *p*, actuated by the wet bulb thermometer *m*, and this spring expands or contracts as the humidity in the kiln rises or falls. The movement of the helical spring is transmitted by arm *q* to pen arm *r*, recording all movements on record sheet *t*, which is rotated by a clock (not shown). The pen arm is counter balanced by weight $r'$ and is pivotally supported at *s*. The movement of pen arm *r* is transmitted to pin-valve-arm *v* by a horizontal link *u*. Said pin-valve-arm *v* is pivotally fixed at $v'$ and actuates pin 2 of the needle valve by means of the set screw $v^2$, which holds the said pin 2 in place against the fluid pressure in the valve chamber 3.

The direct set control, by which the desired humidity is set, is an adjusting nut *z*, connected by arm $z'$ to the arm *y* which sets the pointer *x* for the desired thermostatic conditions in the kiln chamber. On the arm *y* is a slot $y'$ in which a stud $y^2$ fixed on the arm *w* moves. To the stud $y^2$ is fastened a coiled spring $y^3$ by which the arm *v* carrying the set screw $v^2$ is held against the pin 2. The arm *w* is pivotally fixed at $w'$ and may move freely the length of the slot $y'$, thus setting the distance the pin arm *v* may move before the pin 2 will be actuated. In the side of the needle valve 3 an air-leak is provided as an escape for pressure in pipes 9 and 13, the air-leak being controlled by a set screw $4^a$ as usual.

As the humidity in the kiln rises above a predetermined point the arm *v* influenced by the wet bulb thermometer *m*, opens the needle valve 3 and allows the pressure to flow from air reservoir 6 through supply pipe 5, into chamber 4 of the needle valve. The pressure then flows through pipes 9 and 13 to the pressure actuated means *i* and 10, the latter controlling the spray line valve 11 as usual.

The weight *wt*, suspended from the arm *k* is provided, so as to impose greater resistance to the operation of the pressure actuated device *i*, in controlling the roof vent, than is imposed upon the pressure actuated device 10, by which the spray line valve 11 is operated; in that way causing the roof vent to be closed prior to the opening of the spray-line valve, and vice versa, causing the closing of the spray line valve before the opening of the roof vent. The weight *wt* is adjustable in order to vary the amount of resistance imposed on the pressure actuated device *i*.

The device illustrated by Fig. 1 operates as follows:

When the humidity rises in the kiln chamber, the Bourdon spring of the wet bulb thermometer will be actuated, moving the pen-arm, recording such change, and simultaneously opening the needle valve 2, and causing the pressure actuated device 10 to be operated to shut off the steam spray. Then if the humidity continues to rise, the pressure actuated device *i* controlling the roof vent will be operated; the timing of the vent opening after the closing of the spray line is accomplished by adjusting the weight *wt* as mentioned.

A too sudden opening of the vents must not be permitted for such would cause the fluctuation of the temperature and humidity and produce case hardening and checking in the lumber.

In order to prevent this it is necessary to gradually open the vents and it is preferable to arrange the vent opening and closing means so as to operate these means at a predetermined accelerating rate. To this end as the wet bulb temperature rises, the cover 30 is first lifted from off the vent thus permitting only a small amount of air to escape through the space 32 between the sleeve 31 and the vent *c*, which if not sufficient to relieve the excess wet bulb temperature so that the wet bulb thermometer will either cease rising or fall as the case may be, the pressure operating devices will continue to lift the cover arm until the V-shaped notches 33 are raised above the rim of the vent *c*, thereby permitting a more rapid and accelerating rate of escape of the excess humidity until the wet bulb temperature falls and causes the cover arm to move downward and gradually closes the said vent again. Likewise, if after a short time the smaller opening of the vent should not be sufficient, the wet bulb temperature will continue to rise and will cause finally the larger cover plate to be lifted off the vent.

Referring to Fig. 3 showing another type of vent control which comprises two parts *d* and *d'*, the part *d'* is fixed on the stem *e* by a set screw *e'* and covers a hole in the larger cover *d*, which rests on the vent. The larger cover *d* moves freely on the stem *e*. On the lower end of said stem is a spider $d^2$, which as the arm *f* rises, bears against and lifts the cover part *d*. Thus as the lever *f* rises the hole in the cover *d* is first opened, giving a partial outlet for the vent *b*, and finally the latter is opened to full extent. Set in the cover *d* are a number of adjusting screws $d^3$ extending through and threaded into the spider $d^2$, so that the time the cover *d'* will open before the cover *d* is opened, may be controlled. This construction is especially adapted to prevent the too rapid opening of the cover and to permit the control device to maintain a constant wet bulb temperature, within the kiln as when the smaller cover *d'* is first opened, and if the excess humidity is not sufficiently relieved, the pressure operating device will continue to lift the cover arm until the spider strikes the larger cover plate *d*. When this occurs the weight of the larger cover plate will be imposed upon the cover arm *f*, and hence greater pressure will be required to lift the latter, which tends to resist the greater opening of the vent. The smaller opening of the vent may be sufficient to relieve the excess wet bulb temperature; but if not the pressure will build up and finally will lift the cover arm further, thereby lifting the larger cover plate off the vent and opening the latter wide.

Figure 5:
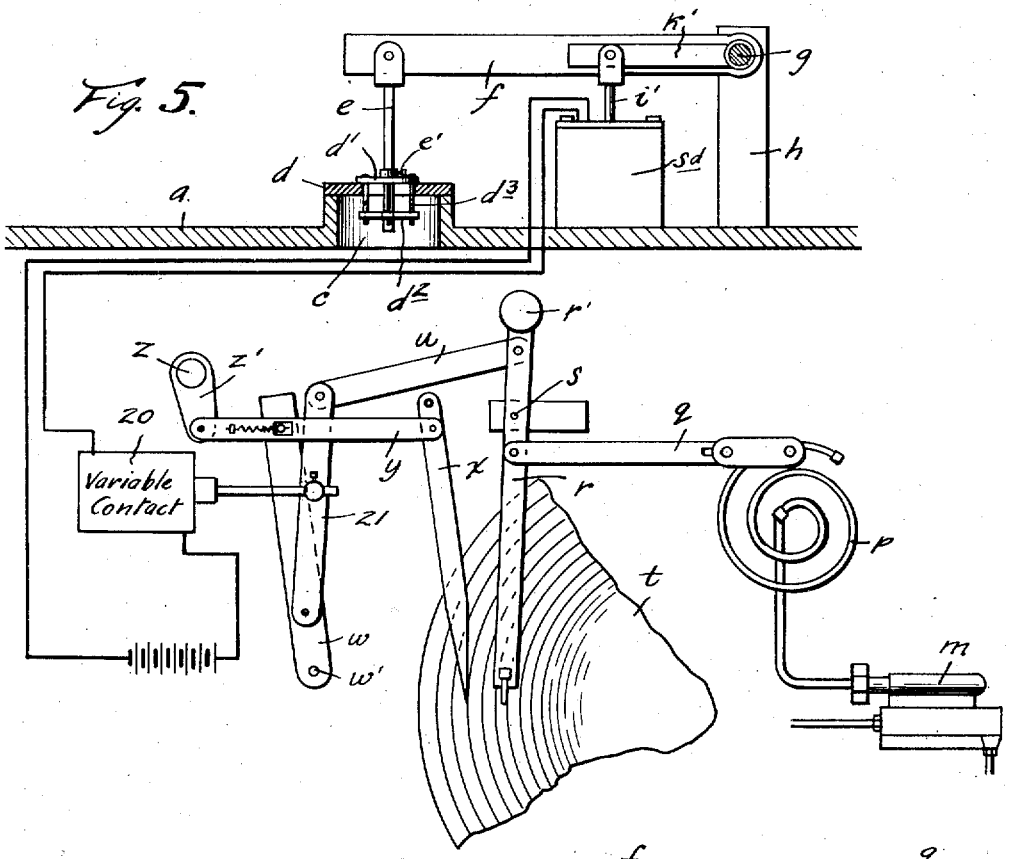
Fig. 5 illustrates diagrammatically that the thermostatically actuated means for controlling the roof vent may be varied; as for example, instead of using pressure actuating means, electro-magnetically operating means may be used.

Referring now to Fig. 5, the means here shown for operating the vent control are similar to those shown in Fig. 1, except for the substitution of the electro-magnetic means as actuating power instead of fluid pressure. The roof *a*, vent *c*, and covers *d* and *d'*, are the same as shown in Fig. 1. A solenoid *sd* when energized raises the solenoid lever *k'* to which is affixed the rock-shaft *g*, which actuates the cover lever *f*, from which is suspended the cover controlling vent *c*.

The solenoid *sd* is actuated by the variable contact 20, which regulates the said solenoid so that it gradually raises the solenoid arm *k'*, and thereby the covers *d* and *d'* in succession as before mentioned.

The plunger arm 21 controls the variable contact 20, and as the wet bulb thermometer *m* actuates the plunger arm 21, according to the degree of humidity in the kiln chamber, the variable contact 20 controls the amount of current going to the solenoid *sd*. As is apparent when the solenoid is de-energized, the vent covers will then be allowed to close down on said vents.

The thermostatic control which I provide for the roof vents of a kiln, as above described, may in like manner be applied to operate cold air gates located at the bottom of the kiln, or other means provided for inducing a circulation of the air within the kiln, these means to be operated in conjunction with, and relatively to the control of said roof vents.

With the above described means for effecting the thermostatic control of the roof vents, the temperature and humidity conditions of the kiln chamber may be accurately maintained as desired. It also reduces the amount of steam consumed in the spray, by automatically closing the roof vent and inducing the evaporation of the moisture from the lumber, thereby utilizing the evaporated moisture as the medium for maintaining the desired humidity within the kiln.

While I have specifically mentioned the Tycos instrument in the foregoing description of my invention, it is, of course, to be understood that any other thermostatically actuated instrument may be used for operating the vent controlling and the air-conditioning means—that is the air humidifying means, or the air heating means, or both means—of the kiln chamber. In other words, instead of the complementary air-conditioning means above described, other, relatively, cooperating, variable, complementary air conditioning means may be employed, according to whether the particular condition of the air within the kiln chamber to be effected is humidity, or temperature, or both. Likewise, while I have described my invention as particularly applicable to a kiln chamber for drying lumber, it may also be found practical for use in drying other articles.

I claim:

1. The combination with a chamber provided with a vent, of automatic means for controlling said vent, pressure actuated means for operating the vent controlling means, a spray line within the chamber, a valve in said spray line, pressure actuated means for operating the spray line valve, an air line connected to each of said pressure actuated means, a thermostatically controlled valve in said air line, the actuating element of such thermostatic control being located within said chamber, and means for differentiating the pressure required for operating the spray line valve from that required for operating said vent controlling means, whereby to cause the operation of the latter means relatively to the operation of the spray line valve.

2. The combination with a chamber provided with a vent and a cover for said vent, of automatic means for moving the cover off and on said vent, pressure actuated means for operating the cover moving means, a spray line within the chamber, a valve in said spray line, pressure actuated means for operating the spray line valve, an air line connected to each of said pressure actuated means, a thermostatically controlled valve in said air line, the actuating element of such thermostatic control being located within said chamber, an adjustable weight arranged to impose more or less resistance to the lifting of said vent cover, whereby to cause the opening of the vent to follow the closing of the spray line and to close the vent prior to the opening of the spray line.

3. In a kiln, and the like, in combination, a vent in the kiln chamber, a control for the vent, means for conditioning the air within the kiln chamber, a control for said air-conditioning means, means operated by a thermostatic instrument located within the kiln chamber whereby said controls are operated, and adjustable means for varying the time interval between the operating of the air conditioning means and the vent control.

4. In a kiln, and the like, in combination, a vent in the kiln chamber, a control for the vent, a spray line within the kiln chamber, a control for said spray line, means operated by a thermostatic instrument located within the kiln chamber, whereby said controls are operated, adjustable means for varying the time interval between the operating of the spray line control and the vent control.

5. In a kiln, and the like, in combination, a vent in the kiln chamber, a cover for the vent and means for operating the same, means for conditioning the air within the kiln chamber, a control for said air conditioning means, means operated by a thermostatic instrument located within the kiln chamber whereby said cover operating means and said control are operated, and adjustable means for varying the time interval between the operating of the air conditioning means and the means for operating the vent cover.

6. In a kiln and the like, in combination with a vent in the kiln chamber, a cover for the vent, means for operating said cover, means for conditioning the air within the kiln chamber, a control for said air conditioning means, means operated by a thermostatic instrument located within the kiln chamber whereby said cover and control are operated, and adjustable means for varying the time interval between the operating of the air conditioning means and the vent cover, said cover operating means opening or closing the vent opening at a rate varying as compared with the corresponding movements of the cover.

7. In a kiln and the like, in combination with a vent in the kiln chamber, a cover for the vent, means for operating the same, means for conditioning the air within the kiln chamber, a control for said air conditioning means, means operated by a thermostatic instrument located within the kiln chamber whereby said cover operating means and said control are operated, and adjustable means for varying the time interval between the operating of the air conditioning means and the means for operating the vent cover, the cover operating means opening and closing the vent opening at a materially increased rate as compared with the similar movements of the cover.

8. In a kiln, and the like, in combination, complementary unit-means for conditioning the air within the kiln chamber, a control for each of said unit-means, and means operated by a thermostatic instrument located within the kiln chamber whereby said controls are operated respectively, one of said controls being variable relatively to the desired time interval between the operations of said unit-means.

9. In a kiln, and the like, in combination, complementary unit-means for conditioning the air within the kiln chamber, pressure actuated controls for said unit-means respectively, a pressure line connected to controls, a thermostatically controlled valve in said pressure line, the actuating element of said thermostatic control being located within the kiln chamber, said pressure actuated controls being variable, whereby to differentiate the pressures required for their operation, respectively, and cause the operation of one of said unit-means relatively to the other.

HOWARD M. CONE.